United States Patent [19]

Tillman

[11] Patent Number: 4,794,718
[45] Date of Patent: Jan. 3, 1989

[54] ICE FISHING ASSEMBLY

[76] Inventor: Duane E. Tillman, P.O. Box 51, Three Lakes, Wis. 54562

[21] Appl. No.: 175,327

[22] Filed: Mar. 30, 1988

[51] Int. Cl.$^4$ ............................................. A01K 97/01
[52] U.S. Cl. .............................................. 43/4; 43/16; 43/17
[58] Field of Search .................................. 43/4, 16, 17

[56] References Cited

U.S. PATENT DOCUMENTS

| | | | |
|---|---|---|---|
| D. 196,888 | 11/1963 | Pilsner | 43/17 |
| 3,010,238 | 11/1961 | Crumrini | 43/16 |
| 3,134,188 | 5/1964 | Peterson | 43/17 |
| 3,213,561 | 10/1965 | Roamer | 43/17 |
| 3,466,781 | 9/1969 | Nelson et al. | 43/4 |
| 3,578,748 | 5/1971 | Hurd | 43/17 |
| 3,745,689 | 6/1973 | Williams | 43/17 |
| 4,253,262 | 3/1981 | Johnson | 43/17 |
| 4,685,240 | 8/1987 | Fralick | 43/16 |

Primary Examiner—Nicholas P. Godici
Assistant Examiner—Karen Skillman
Attorney, Agent, or Firm—Richard C. Litman

[57] ABSTRACT

An ice fishing assembly includes a conical ring member adapted for the insertion of a fishing pole having a spring-type signaling device. Two displaceably connected sections of transparent plastic resilient material normally enclose the top opening of the ring member and permit the extraction of fish during which the sections are automatically displaced. The plastic sections are interchangeable with styrofoam sections of the same size to further retard and prevent the passage of heat and air energy from the water to the atmosphere. A plurality of assemblies may be nested together and carried in a common receptacle with the fishing apparatus poles in the central cavity of the innermost ring member to be conveniently transported as a kit to allow the fishing of a plurality of ice holes.

18 Claims, 2 Drawing Sheets

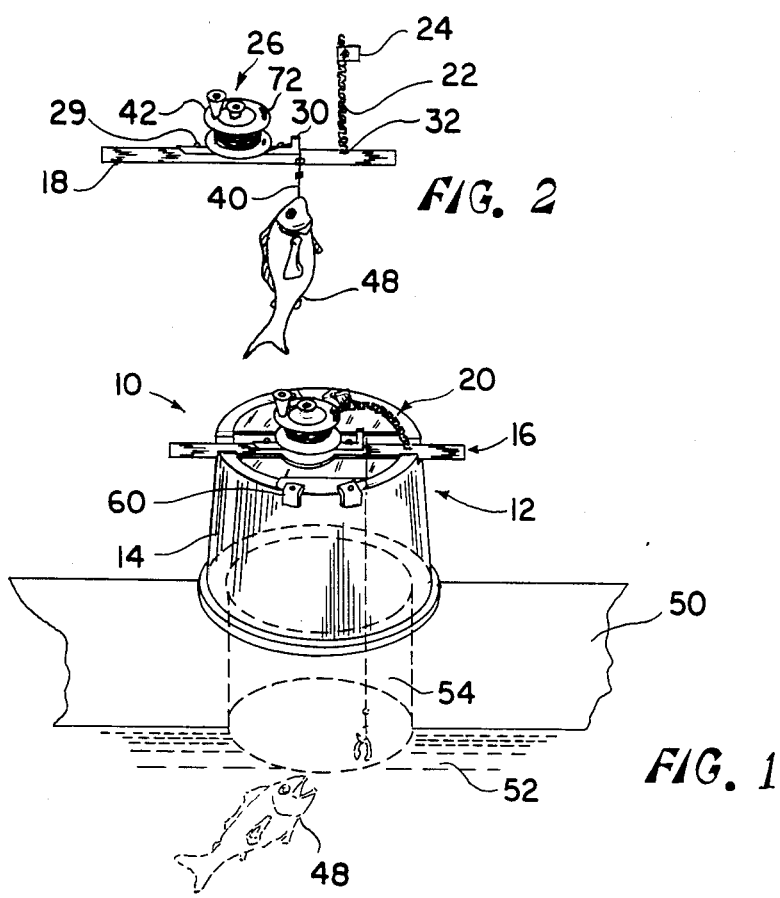
FIG. 2
FIG. 1
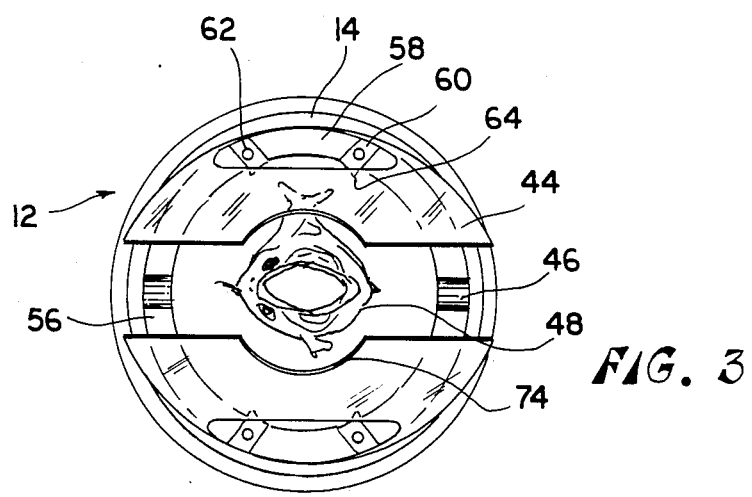
FIG. 3

ICE FISHING ASSEMBLY

BACKGROUND OF THE INVENTION

In the sport of ice fishing, it is customary to provide or cut an opening in the frozen surface of an ice covered body of water. This water filled opening, commonly called an ice fishing hole, provides the means through which the act of fishing is performed. Depending on weather conditions and subsequent lower temperatures, the ice fishing hole can freeze as solid and to the same depth as the surrounding ice. It is therefore the intention of the fisherman to prevent or retard the freezing of ice holes during the duration of a fishing session.

Existing devices serve the purpose of preventing or retarding the freezing of ice fishing holes but do not enable the fisherman the convenience of fishing simultaneously using a fishing rod having a signaling assembly which is inserted within the ice fishing assembly. Furthermore, the previous art does not allow the nesting of a plurality of the devices for transporting convenience and easy assembly for the purpose of fishing in a plurality of ice holes simultaneously.

The use of an ice fishing device for retarding the freezing of holes provided in the frozen surfaces of a body of water is broadly known. In this respect, U.S. Pat. No. 3,831,891, issued June 4, 1974, to Homer Wootten, discloses an apparatus utilizing a buoyant housing having a passage therethrough and lids in the housing for retarding an ice fishing hole from freezing when not in use.

The use of flag assemblies in combination with fishing "tip-ups" is generally well known in the art. The general purpose of a fishing "tip-up" apparatus which includes the use of a signaling device is to alert a fisherman as to when a fish has taken the bait. In this respect, U.S. Pat. No. 4,373,287, issued Feb. 15, 1983, to Paul F. Grahl, illustrates a fishing "tip-up" having a signaling device comprising a spring shaft with a flag on the free end thereof.

SUMMARY OF THE INVENTION

The general purpose of the present invention is to provide an ice fishing assembly which includes the use of a conical ring member having diametrically opposed notches for the insertion and retention of a fishing pole provided with a signaling device mounted at an intermediate point on the pole. An improved arrangement is provided wherein a plurality of ice fishing assemblies may be nested together to form a compact assembly wherein a plurality of the fishing poles may be disposed in the central cavity of the inner most ring member and carried in a common receptacle to be conveniently transported, therefore allowing the simultaneous fishing of a plurality of holes. Two displaceably connected sections of transparent plastic resilient material normally enclose the top of the ring member and permit the extraction of fish during which the sections are automatically displaced. These sections are interchangeable with displaceably connected styrofoam sections of the same size to further retard the freezing of water in an ice hole.

It is therefore an object of the present invention to provide an improved ice fishing assembly for preventing or retarding an ice fishing hole from freezing while simultaneously permitting the fisherman to continue fishing.

More specifically, it is an object of this invention to provide a fishing pole having a signal flag device utilizable in combination with an assembly comprising a conical ring member adapted for placement over a hole for the prevention of dissipation of heat from the water to the atmosphere so as to preclude water in the hole from freezing.

It is also an object of this invention to provide an improved arrangement of ice fishing assemblies whereby a plurality of said assemblies may be nested together and carried in a common receptacle to allow the fishing of a plurality of ice holes.

The foregoing and other objects and advantages of the subject invention will become apparent from the following description and the accompanying drawings, in which:

DESCRIPTION OF THE DRAWINGS

FIG. 1 is a perspective view of an ice fishing assembly embodying the principals of the subject invention.

FIG. 2 is a perspective view of the fishing rod assembly showing a fish attached to the hook end of the rod.

FIG. 3 is a top view of the conical ring member showing the resilient sections automatically displaceable upon the extraction of a fish.

DESCRIPTION OF THE PREFERRED EMBODIMENTS

Figure 4:
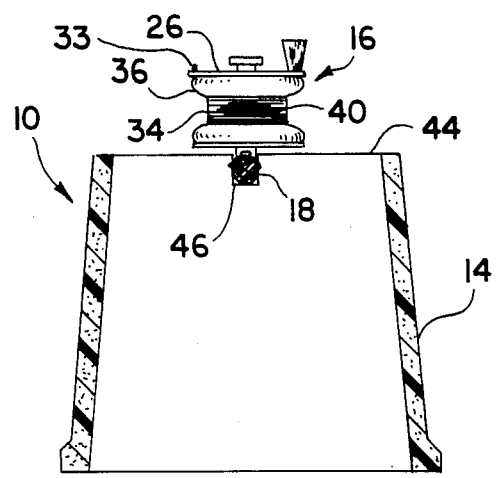
FIG. 4 is a cross-sectional view of the assembly of FIG. 1.

Reference is now made to the drawings, wherein like numerals refer to like parts throughout. As is best seen in FIG. 1, wherein there is illustrated, in perspective, a preferred embodiment of an ice fishing assembly forming the present invention and generally designated by the numeral 10. In this respect the assembly 10 includes a body member assembly 12 and a fishing rod assembly 16 displaceably attachable to the body member assembly.

As shown in FIG. 1, the body member assembly 12, adapted for use on a frozen ice surface 50 in which a hole 54 has been provided, comprises a conical ring member 14 which is made of a substance having a very low thermal conductivity, such as formed or molded styrofoam. As persons versed in the art will appreciate, various other materials of low thermal conductivity, other than styrofoam, may be utilized in practicing the subject invention.

As shown in FIG. 2 and FIG. 4, the fishing rod assembly 16 includes a rod 18 having attached at an intermediate point thereof, a signal flag device 20 which essentially comprises a steel spring arm 22 to which is mounted a flag 24 by conventional means, such as an adhesive. The spring arm 22 is positionable within a groove 32 located at an intermediate distance on the fishing rod 18. As is best shown in FIG. 4, fishing rod assembly 16 is further provided with a fishing reel 26 having a fishing line 40 wound thereon. The reel 26 includes a pair of parallel aligned, spaced-apart circular plates 36 which are integrally connected by a hollow spindle shaft member 34 about which the fishing line 40 is wound. As is best shown in FIG. 2, the reel 26 is secured to the fishing rod 18 by means of an arched plastic element 28 containing a grommet 30 which serves as a guide for receiving the fishing line. The securing element 28 is located at an intermediate distance on the fishing rod 18 and is secured to the rod 18 by means of a threaded bolt 29. The entire fishing rod 18, including all of the apparatus attached thereto, is inserted into the diametrically opposed notches 46 which are positioned in the upper peripheral edge 72 of the conical ring member 17.

The purpose of the signaling device 20 is to provide a signaling means to alert a fisherman as to when a fish 48 has struck the bait 66. In operation, the hook is baited and the fishing line 40 is reeled through the open cavity of the conical ring member 14, after which the spring shaft 22 is engaged in the hook 72. The hook 72 positioned on the top outer edge of the reel 42; thus, when a fish has struck the bait, the reel 42 turns disengaging the spring shaft 22. The fisherman knows of the catch because of the erect position of the spring shaft 22.

Figure 5:
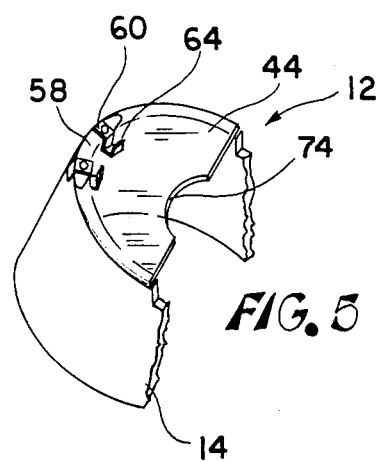
FIG. 5 is a cross-sectional view of the conical ring member of FIG. 3.

As shown in FIGS. 3 and 5, the body member assembly 12 is further provided with two displaceably connected sections of resilient transparent plastic material 44 having notched semicircular indentations 74 for facilitating the insertion of the fishing rod assembly 16 in the conical ring member 14. The resilient transparent sections 44 which are held in position by plastic clamping elements 58 comprising two S-shaped elements 60 forcibly pressed over the upper peripheral edge of the conical ring member 14. The S-shaped elements 60 with the serrations on the inner surface thereof may, for example, serve to hold alternate heat sources such as disposable hand warders which increase the efficiency of the ice fishing assembly. The ice fishing assembly 10 may hold up to four alternate heat sources which increases the efficiency of the device in further preventing or retarding the freezing of ice 50 in a fishing hole 54. The resilient semicircular plastic sections 44 repose flush with the upper edge of the notches 46 and the notched semi-circular indentations 74 allow the fishing rod 18 to be inserted into the vertical notches 46 with minimal clearance. The resilience of the transparent plastic sections 44 allows the extraction of fish 48 during which the sections are automatically displaced.

As shown in FIG. 4, the reel assembly 26 is displaceably attached to the conical ring member 14. The fishing rod 18 rests in the diametrically opposed vertical notches 46 and the semi-circular resilient plastic sections 44 are flush with the upper edges of the notches 46 and therefore flush with the upper edges of the longitudinal outer diameter of the fishing rod 18 just under the reel assembly 16.

Figure 6:
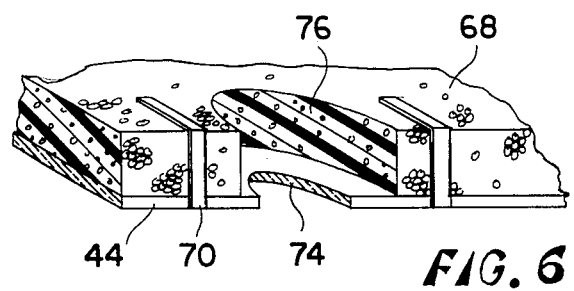
FIG. 6 is a partial front elevation view, in section, illustrating the connection between the resilient, plastic material and the styrofoam section.

As shown in FIG. 6, the efficiency of the ice fishing assembly 10 may be further increased by attaching to the resilient plastic sections 44, styrofoam sections 68 of the same size. The styrofoam sections 68 having notched semi-circular indentations 76 for viewing are held in position by conventional means, such as a clip 70. As persons versed in the art will appreciate, various other attaching means other than a clip may be utilized in practicing the subject invention.

Figure 7:
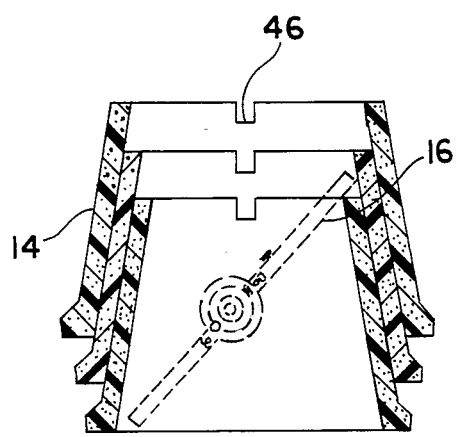
FIG. 7 is a cross-sectional view of a plurality of assemblies nested together with the fishing apparatus resting in the resulting central aperture.

As shown in FIG. 7, a plurality of ice fishing assemblies may be nested together and carried in a common receptacle having the ice fishing assemblies disposed in the resulting cavity therein. This improved arrangement provides an ice fishing kit which can be conveniently transported and which allows for the fishing of a plurality of ice holes simultaneously.

To employ the assembly 10 of the subject invention, a hole 54 must be provided in the surface of the frozen ice 50. The conical ring member 14 is adapted to be disposed around the perimeter of the ice hole and snow or chipped ice is packed around the lower lip of the conical ring member 14. The fishing rod assembly 16 is inserted into the diametrically opposed notches 46 on the upper peripheral edge 56 of the conical ring member 14. To facilitate the act of fishing, the fishing line 40 is lowered between the edges of the resilient transparent plastic lids 44 and down through the passage through the conical ring member 14. The flag assembly 20 comprising a spring shaft 22 and a flag 24 is set so that when a fish 48 strikes the bait 66, the spring shaft 22 springs forward to alert the fisherman that the bait has been struck. He may then lift up the rod 18 to extract the fish 48 through the passage of the conical ring member 14 and by so doing, automatically displace the resilient plastic sections 44.

During the course of using the subject apparatus, the user may wish to augment the ability of the device to retard freezing of the ice fishing hole. In this situation, the user merely removes the fishing rod assembly 16 from its placement in the notches 46 in the conical ring member 14 and positions the styrofoam sections 68 on the resilient plastic sections 44 and then fastens the assemblage together by means of a clip 70. By these steps, a method is provided to further retard the freezing of an ice fishing hole. The ice fisherman may recommence fishing merely by inserting the fishing rod assembly 16 into the notches 46 of the conical ring member 14. A bobber which floats on the surface of the water 52 is often used in conjunction with ice fishing assembly 10 as an alternate signaling device and thus the notched semi-circular indentations 76 allow the fisherman to view the bobber through the resilient plastic sections 44 while simultaneously retarding the freezing of water 52.

The foregoing is considered as illustrative only of the principles of the invention. Further, since numerous modifications and changes will readily occur to those skilled in the art, it is not desired to limit the invention to the exact construction and operations shown and described, and accordingly, all suitable modifications and equivalents which fall within the scope of the invention may be resorted to.

I claim:

1. Ice fishing assembly for retarding the freezing of ice in a fishing hole while simultaneously allowing the hole to be fished comprising, in combination, a substantially frusto-conical ring member having upper and lower peripheral edges, displaceably connected substantial semi-circular sections on said upper edge, said sections provided with an arcuate edge joined by a transverse edge, a fishing rod assembly displaceably insertable between said transverse edges, said ring member adapted to be disposed around an ice fishing hole with said lower edge in contact with the ice surface and said upper edge in contact with the atmosphere.

2. The ice fishing assembly of claim 1 wherein said sections are resilient plastic.

3. The ice fishing assembly of claim 2 wherein said plastic is transparent.

4. The ice fishing assembly of claim 1 wherein each said transverse edge is provided with an indentation.

5. The ice fishing assembly of claim 2 wherein said resilient sections include alternate attachable sections.

6. The ice fishing assembly of claim 5 wherein said alternate attachable sections are formed of low thermal conductive material.

7. The ice fishing assembly of claim 5 wherein said attachable sections are provided with indentations.

8. The ice fishing assembly of claim 7 wherein indentations are arcuate.

9. The ice fishing assembly of claim 4 wherein said indentations are juxtaposed to one another.

10. The ice fishing assembly of claim 1 herein said frustoconical ring member is formed of a low thermal conductive material.

11. The ice fishing assembly of claim 1 wherein said ring member is formed of expanded foam.

12. The ice fishing assembly of claim 1 wherein said fishing rod assembly includes a fishing rod, an attached reel, and a signaling device.

13. The ice fishing assembly of claim 12 wherein said fishing rod is made of wood.

14. The ice fishing assembly of claim 12 wherein said reel is positioned at an intermediate distance on said rod.

15. The ice fishing assembly of claim 12 wherein said signaling device comprises a spring shaft and a flag.

16. The ice fishing assembly of claim 1 wherein a plurality of said ring members may be nested together with a plurality of said fishing rod assemblies adapted to be disposed therewithin, whereby a kit is formed.

17. The ice fishing assembly of claim 16 including a receptacle containing said kit.

18. The ice fishing assembly of claim 12 wherein, said ring upper edge includes a pair of diametrically opposed notches adapted to receive said fishing rod.

* * * * *